June 6, 1967   E. R. FITZGERALD   3,324,410
APPARATUS FOR PRODUCING, DETECTING AND APPLYING INTERNALLY
GENERATED PARTICLE WAVES IN CRYSTALLINE SOLIDS
Filed May 5, 1965   9 Sheets-Sheet 1

INVENTOR
EDWIN R. FITZGERALD

BY Larson and Taylor

ATTORNEYS

INVENTOR
EDWIN R. FITZGERALD

BY *Larson and Taylor*

ATTORNEYS

INVENTOR
EDWIN R. FITZGERALD

INVENTOR
EDWIN R. FITZGERALD
BY Larson and Taylor
ATTORNEYS

INVENTOR
EDWIN R. FITZGERALD

June 6, 1967  E. R. FITZGERALD  3,324,410
APPARATUS FOR PRODUCING, DETECTING AND APPLYING INTERNALLY
GENERATED PARTICLE WAVES IN CRYSTALLINE SOLIDS
Filed May 5, 1965  9 Sheets-Sheet 8

INVENTOR
EDWIN R. FITZGERALD

BY Larson and Taylor

ATTORNEYS

June 6, 1967 E. R. FITZGERALD 3,324,410
APPARATUS FOR PRODUCING, DETECTING AND APPLYING INTERNALLY
GENERATED PARTICLE WAVES IN CRYSTALLINE SOLIDS
Filed May 5, 1965 9 Sheets-Sheet 9
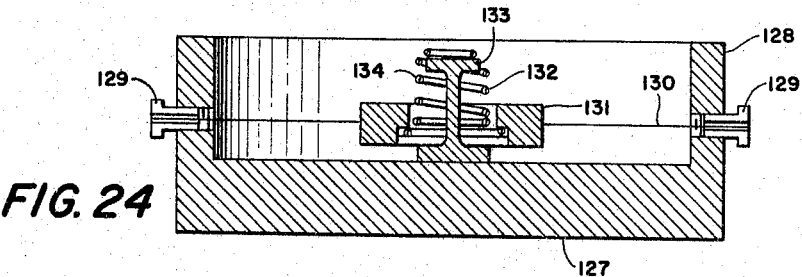
FIG. 24
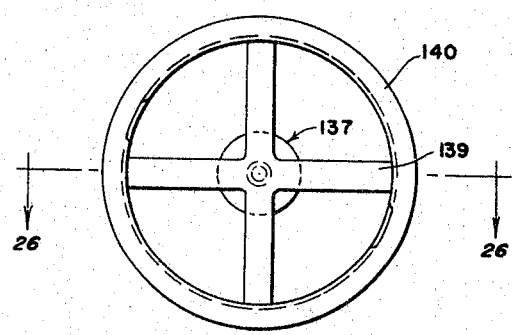
FIG. 25  FIG. 26
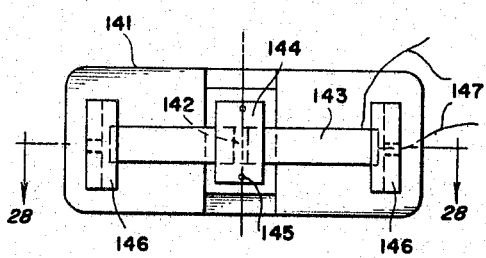
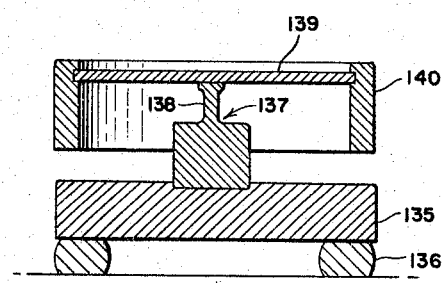
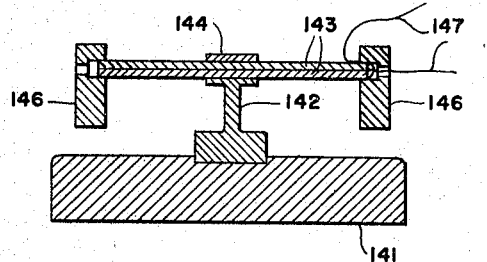
FIG. 27  FIG. 28
INVENTOR
EDWIN R. FITZGERALD
BY *Larson and Taylor*
ATTORNEYS

3,324,410
APPARATUS FOR PRODUCING, DETECTING AND APPLYING INTERNALLY GENERATED PARTICLE WAVES IN CRYSTALLINE SOLIDS
Edwin R. Fitzgerald, 1409 Walnut Hill Lane, Baltimore, Md. 21204
Filed May 5, 1965, Ser. No. 453,439
23 Claims. (Cl. 331—94)

The present invention relates to internally generated particle waves in crystalline solids and other materials, more particularly, to apparatus and methods for producing, detecting and utilizing such particle waves including the amplification of sound waves or mechanical vibrations and the production of vibrations in a self-contained mechanical oscillator.

The occurrence of *elastic* modes of vibration in solid bodies dependent jointly on their elastic properties, geometrical shape, and external, overall, macroscopic dimensions have been known and understood in detail for a long time. However certain mechanical resonance dispersions of a non-elastic type have been found in single and poly crystals of many materials. These resonances are independent of sample size and, in fact, have been found around $3 \times 10^3$ c.p.s. in small samples where the lowest elastic modes occur above $6 \times 10^5$ c.p.s. All previous results of this type, however, were obtained from alternating shear measurements sensitive to the relative transverse displacement between parallel faces of small disk-shaped samples or from a measure of the over-all response of a large bar. These non-elastic resonances were unexpected and unexplained on the basis of ordinary continuum elastic theory. Such *surface* to *surface* measurements have now been extended to a determination of *surface* to *point* or *point* to *point* relative displacements by means of the simple apparatus described herein. The results not only confirm the existence of non-elastic audio-frequency resonances, but show that directional audio-frequency sound beams can be generated in single crystals. Further from results obtained by this new method the existence of the resonances and beams can now be attributed to internally generated particle momentum waves propagating through the crystals. Such internally generated particle waves, in fact, can be shown to be intimately connected with deformation in solids and the *internal* structure of solids rather than *external* shape and dimensions.

It is therefore the principal object of the present invention to provide a simple and inexpensive apparatus and method for demonstrating the wave properties of particles in accordance with theories of matter.

It is another object of the present invention to provide an apparatus and method for the amplification of sound waves or mechanical vibrations.

It is an additional object of the present invention to provide an apparatus and method as a self-contained source of vibrations or sound.

It is a further object of this invention to provide a method for predicting fracture or failure of a structural member or part under steady or oscillating mechanical load prior to the occurrence of such failure.

It is an additional object of the present invention to provide the novel and improved mechanical oscillator which functions as a self-contained source of vibrations or sound.

It is a further object of the present invention to provide an apparatus for the generation of directional sound beams of both low and high frequencies.

It is still another object of the present invention to provide a small, compact and sensitive apparatus for both omnidirectional and directional detection of sound and vibration including sonar pulses.

It is still an additional object of the present invention to provide a rapid, accurate and inexpensive method for determining the orientation of single crystal samples.

It is still a further object of the present invention to provide a method and apparatus for determining new mechanical constants and characteristics for the purpose of increasing understanding and knowledge of the structure of solids.

It is yet another object of the present invention to provide a method and apparatus for determining new mechanical constants and characteristics of solids for correlations with the mechanical properties including the fracture or flow of such solids under load.

It is yet another object of the present invention to provide a self-contained electrical oscillator for generating alternating electrical currents and voltages without the use of electro-chemical batteries.

It is yet an additional object of the present invention to provide a self-contained apparatus for amplifying alternating electrical currents and voltages through mechanical means.

The apparatus by means of which internally generated particle waves may be produced and detected essentially comprises a piezoelectric agitator constructed from two ceramic discs having silvered faces with the discs being polarized to vibrate axially when alternating voltage is applied between the adjacent inner faces and the two grounded outer faces. The agitator is mounted upon a large, stainless steel block upon which is mounted a post and an arm extending therefrom to hold an ordinary hi-fi ceramic pick-up cartridge. The cartridge is positioned horizontally so that the needle is sensitive to vertical motion. The voltage output from the pick-up cartridge is read upon a vacuum tube voltmeter while the agitator is driven by any low distortion audial oscillator capable of 1 to 2 watts output. The pickup is first placed against the side of the agitator to obtain its response as a function of frequency at constant driving voltage. The post upon which the pickup is mounted is fitted into a track running concentrically around the agitator to permit measurements circumferentially of the agitator. A modification of this apparatus employs a small turn-table on the stainless steel block upon which the agitator is positioned so that the agitator is rotated while the post holding the pickup remains stationary.

Several other forms of apparatus which function as oscillators will also be described in detail.

Other objects and advantages of the present invention will be apparent from the accompanying specification when taken in conjunction with the following drawings, wherein.

Figure 11:
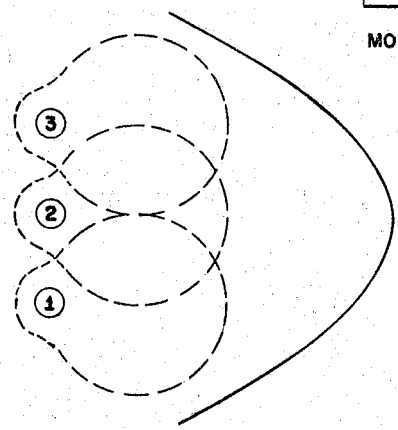

FIGURE 11 schematically illustrates the combined beam (solid line) obtained from an array of three individual single crystal beams (dashed lines).

Figure 12A:
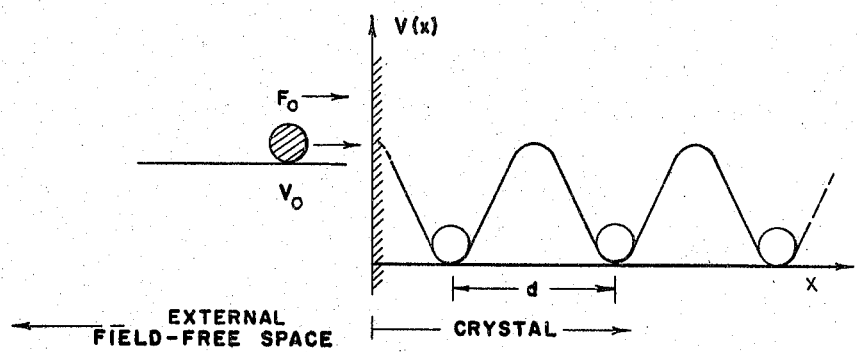
Figure 12B:
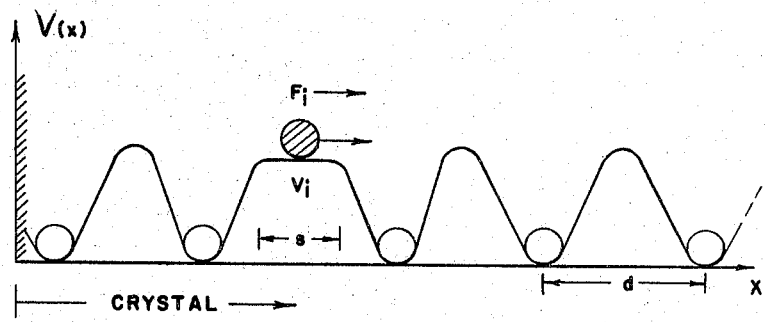
Figure 13:
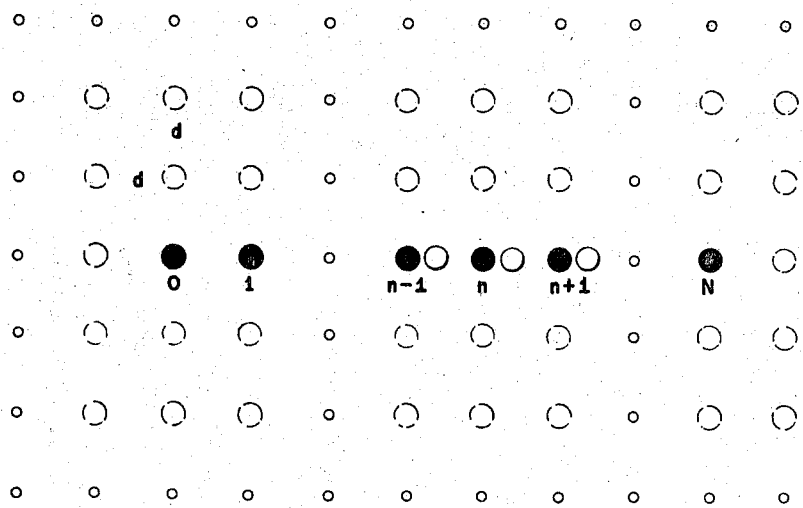
Figure 14:
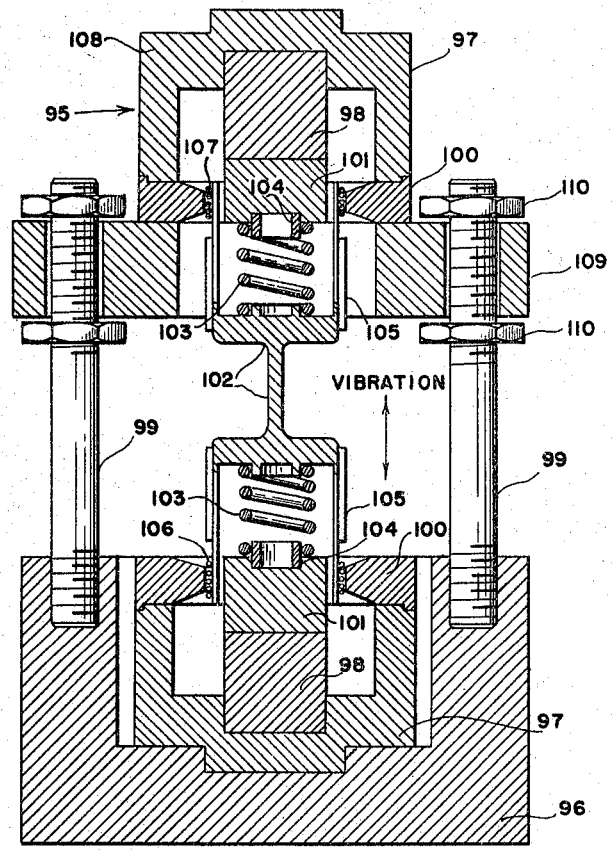
Figure 15:
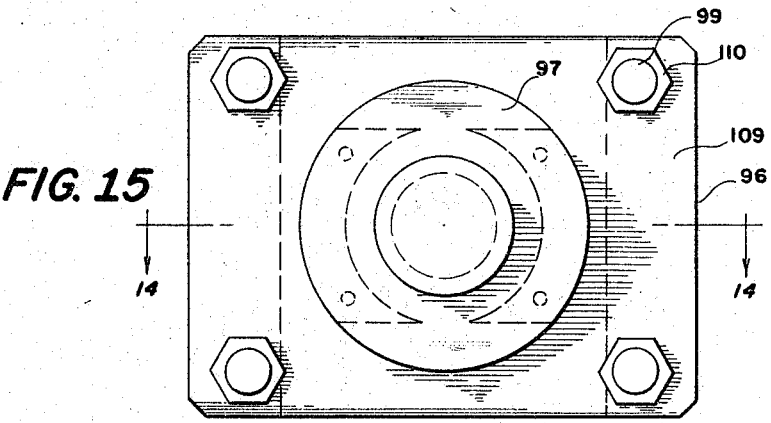
Figure 16:
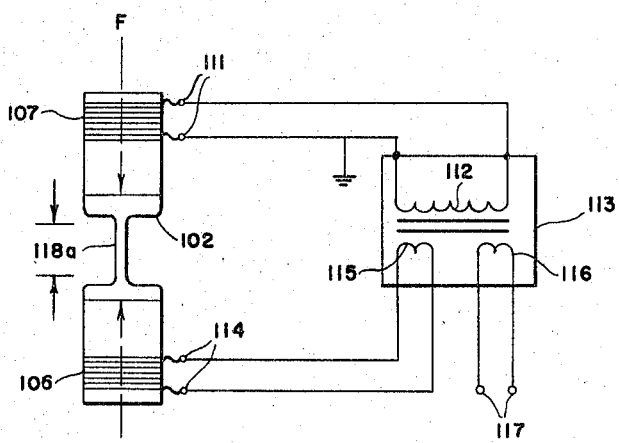
Figure 18:
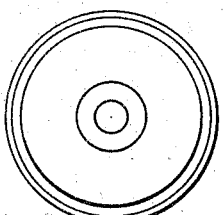
Figure 17:
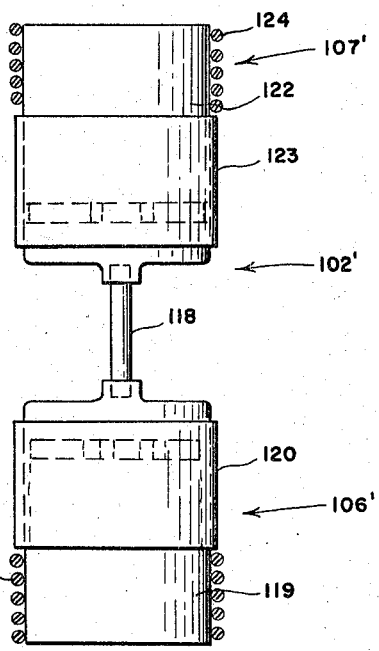
Figure 19:
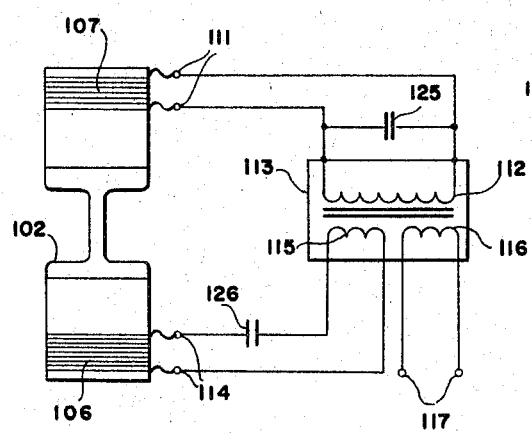
Figure 20:
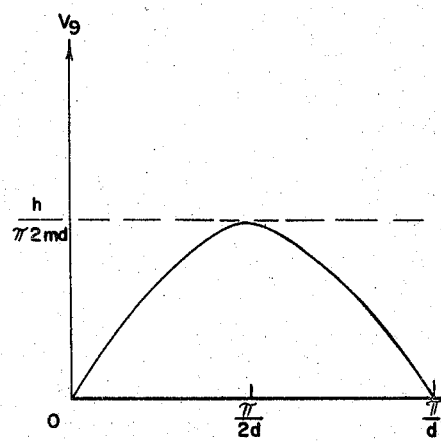
Figure 21:
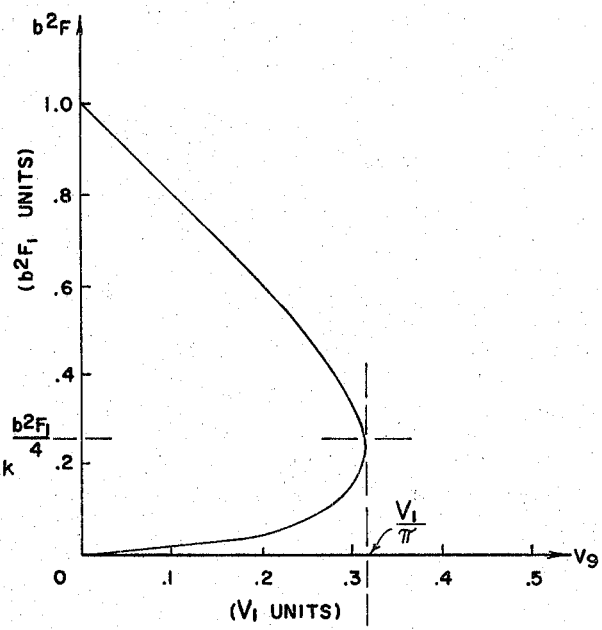
Figure 22A:
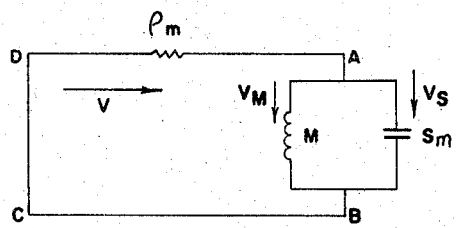
Figure 22B:
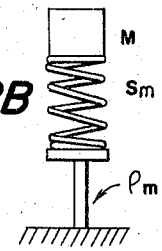
Figure 23:
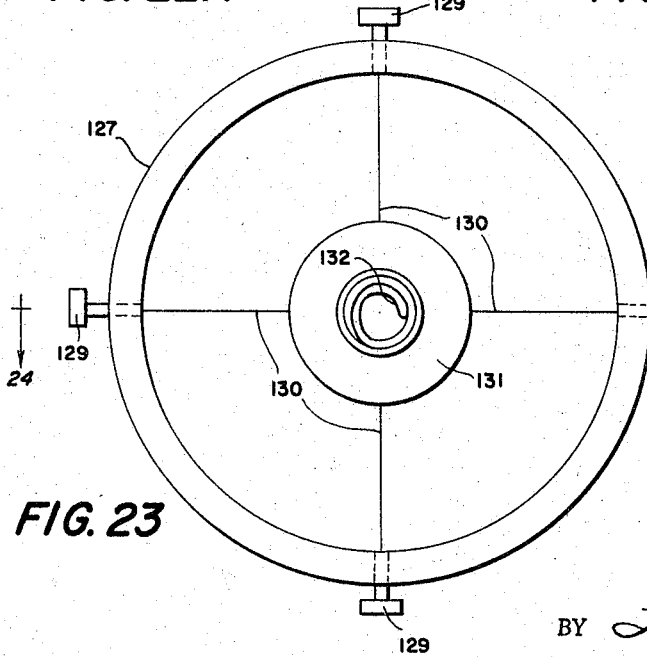

FIGURE 12a schematically illustrates an external free particle incident on, or approaching a crystal of periodic spacing $d$;

FIGURE 12b schematically illustrates an internal free particle in a crystal of periodic spacing $d$;

FIGURE 13 shows a schematic representation of a lattice segment of length $S=Nd$ (solid circles) in a square (two-dimensional) monoatomic crystal lattice of spacing $d$;

FIGURE 14 is a vertical sectional view taken along the line 14—14 of FIGURE 15 of a particle wave oscillator, according to the present invention;

FIGURE 15 is a top plan view of the oscillator shown in FIGURE 14;

FIGURE 16 is a schematic diagram illustrating the electrical connections between the driving element of FIGURE 14 and the windings of a transformer;

FIGURE 17 is an elevational view of a modification of the driving element of the oscillator of FIGURE 14;

FIGURE 18 is an end view of the driving element shown in FIGURE 17;

FIGURE 19 is a schematic diagram similar to that of FIGURE 16 but containing a further improvement in that the electrical output as well as the mechanical output is tuned;

FIGURE 20 is a graph plotting the group velocity of a particle wave $v_g$ against the wave vector $k$;

FIGURE 21 is a graph plotting the force on a particle $F_1$ against the group velocity of a particle wave $v_g$;

FIGURE 22a is a schematic representation of the mechanical circuit equivalent to the arrangement of a mass spring and a negative resistance crystal to form a mechanical negative resistance oscillator;

FIGURE 22b is a schematic representation of a mechanical arrangement equivalent to the circuit of FIGURE 22a;

FIGURE 23 is a top plan view of a mechanical negative resistance oscillator according to the present invention;

FIGURE 24 is a sectional view taken across the line 24—24 of FIGURE 23;

FIGURE 25 is a top plan view of a modification of the mechanical negative resistance oscillator of FIGURES 23 and 24;

FIGURE 26 is a sectional view taken along the line 26—26 of FIGURE 25;

FIGURE 27 is a top plan view of a further modification of a mechanical negative resistance oscillator using a piezoelectric bilaminate as the spring element; and FIGURE 28 is a sectional view taken along the line 28—28 of FIGURE 27.

Proceeding next to the drawings wherein like reference symbols indicate the same parts throughout the various views, a specific embodiment and several modifications of the present invention will be described in detail.

Figure 1:
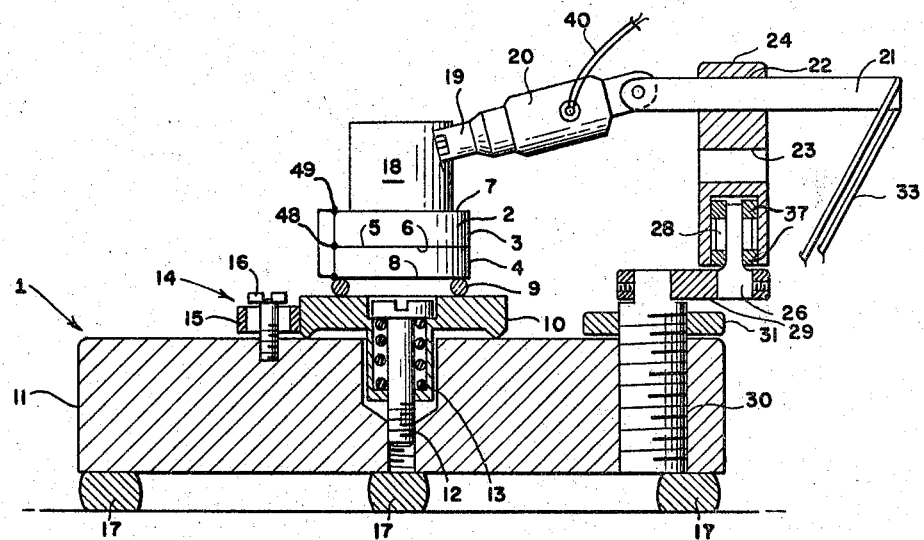
FIGURE 1 is an elevational view of the apparatus for producing and detecting internally generated particle waves with a portion of the apparatus being in section taken across the line 1—1 of FIGURE 2.
Figure 2:
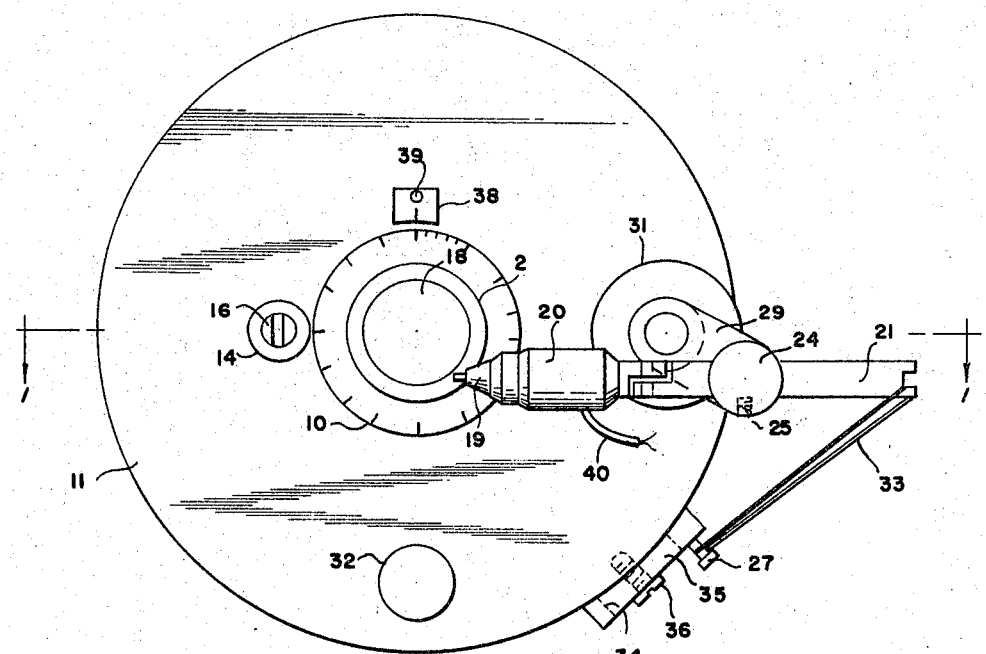
FIGURE 2 is a top plan view of the apparatus illustrated in FIGURE 1.

Referring particularly to FIGURES 1 and 2, there is illustrated therein an apparatus for producing and detecting internally generated particle waves according to the present invention and indicated generally at 1. The apparatus comprises a piezoelectric agitator or vibrator 2 consisting of discs 3 and 4 of barium titanate or some other piezoelectric material such as quartz, Rochelle salt, or the like; the faces of the discs 3 and 4 are silvered as electrodes and the discs are provided with axial polarization so that a voltage applied across the faces produces an axial extension or contraction. The inner faces 5 and 6 of the discs have the same polarity (e.g., plus) as have the two outer faces 7 and 8 (e.g., minus).

The agitator 2 is mounted upon a rubber O-ring 9 or other de-coupling device so as to minimize random vibrations. The O-ring is positioned on the upper face of a stainless steel turn-table 10 which is graduated at 2° intervals around its circumference so that the angular position of the crystal may be determined relative to some initial position.

The turn-table 10 is mounted upon a stainless steel base or platform 11 by means of a fastening screw 12 and a hold-down spring 13 by means of which the pressure exerted by the fastening screw 12 maintains the turntable 10 in firm but gentle contact with the base 11.

The outer periphery of the turn-table 10 is in engagement with a friction drive 14 having a rubber periphery 15 and secured to the base 11 by a fastening screw 16. The base 11 is mounted upon a surface by rubber grommets or other pads 17 in order to isolate the base 11 from building or other random vibrations which might otherwise interfere with the test vibrations and produce noise or background signals in the pickup to be presently described.

Mounted upon the agitator 2 is a suitable single or poly crystal sample 18 which may be of any shape. The sample disclosed herein is shown as a right circular cylinder. A ceramic pickup cartridge 19 of the hi-fidelity phonograph type is positioned horizontally and has its needle in engagement with the outer surface of the sample 18. The pickup used is an Astatic Model No. 89 TBX but other types of pickups can be employed. There is a stainless steel housing 20 surrounding the pickup providing for electrostatic shielding and positioning of the needle against the sample by means of an adjustable connection to a support rod 21. The support rod 21 is slidably positioned in either of two holes 22 and 23 located in the mounting post 24. The support rod 21 may also be rotated axially and is fixed in the desired position by set screw 25 shown in FIGURE 2. The post 24 is mounted to rotate freely about a spindle 26 by means of ball-bearing assemblies 37 which are spaced by a stainless steel spacer 28. The spindle 26 is mounted in a post arm which is rotatably mounted on a base 30. The arm 29 is fastened in the desired position by means of a set screw tightened against the top portion of the base 30 but not shown in the drawings. The post base 30 may be locked in position by a knurled locking nut 31.

Another threaded hole 32 is provided in the base 11 to accommodate an additional post base 30 so as to provide for another pickup. By employing two pickups the vibrations on two points on the sample may be detected simultaneously.

A spring or rubber band 33 is connected between the outer end of the support rod 21 and a movable clamp 34 which is slotted at 35 and secured against the base 11 by a fastening screw 36. A screw or hook 27 is provided on the adjustable clamp 34 for securing one end of the spring 33. Positioning the adjustable clamp 34 along the circumference of the base 11 controls the tension in the spring 33 and accordingly, the pickup needle pressure against the sample 18.

On the upper face of the base 11 is provided an index marker or reference point 38 for cooperation with the graduated turn-table 10 and secured by a fastening screw 39.

Figure 3:
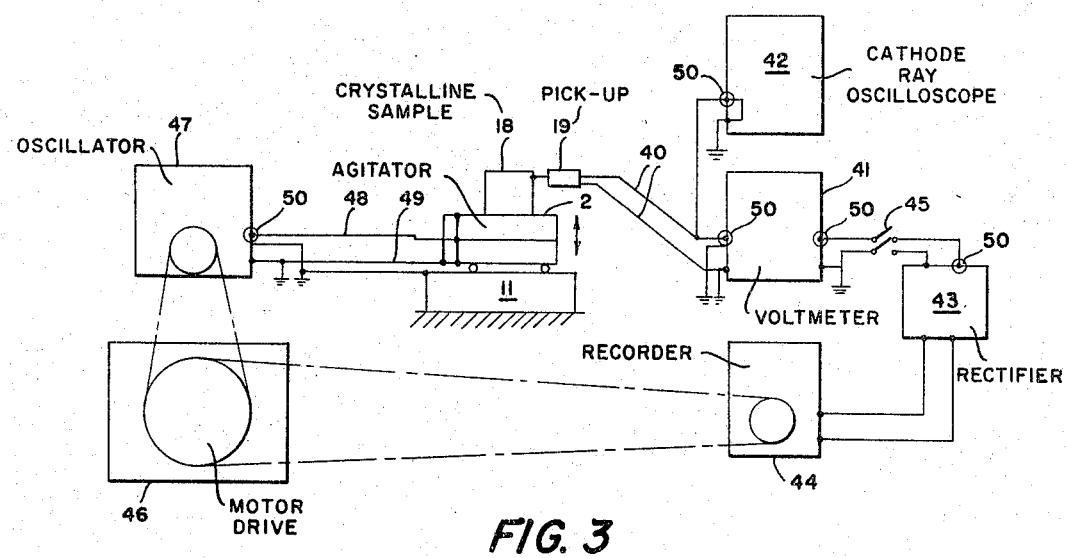
FIGURE 3 is a diagrammatic view showing the manner in which the apparatus of FIGURES 1 and 2 is connected to the several components for producing and detecting the oscillations.

The pickup 19 is connected by shielded leads 40 to a sensitive vacuum tube voltmeter 41 reading to 0.01 mv. and which reading is proportional to the voltage generated in the pickup 18 by vibration. A cathode ray oscilloscope 42 is connected to the voltmeter as shown in FIGURE 3 in order to obtain the wave form as well as the amplitude of the electrical signal from the pickup 19. A rectifier 43 is provided by means of which the amplified A.C. output from the voltmeter 41 may be changed to D.C. for imput to a recorder 44. The amplified rectified signal from the pickup 19 is thus recorded. A switch 45 is provided to connect the output of the voltmeter to the rectifier and then to the recorder.

A motor drive 46 is provided to simultaneously drive the recorder 44 and the dial of an oscillator 47. This simultaneous drive provides an autumtic record of pickup signal or voltage vs. frequency for any position of the pickup needle on the sample. The oscillator 47 is an audio oscillator which produces an alternating voltage across the faces of the agitator 2 and thus causes it to vibrate. The oscillator 47 is connected to the agitator by a high potential (shielded) lead 48 and a low potential (grounded lead) 49.

The circles around terminals in the diagram of FIGURE 3 indicate electrostatic shielding and are indicated at 50. The oscillator 47 is of the low distortion type and has an output of one to two watts.

The pickup 19 is first placed against the side of the agitator 2 near its top face in order to obtain its response as a function of frequency at constant driving voltage. For agitators made from barium titanate discs this response is fairly constant in the range from 100 to 10,000 c.p.s. if the discs are not so large that their normal modes lie in this range. The response of the agitator is also quite uniform around its circumference as determined by revolving the agitator 2 on the turn-table 10 while the post holding the pickup remains fixed in the base 11. Agitator discs with diameters from ¼ to 1½ inches and thicknesses from ⅟₁₆ to ¼ inches all give similar results.

In constructing the agitator 2, a piece of aluminum foil may be placed between the discs to form the high potential electrode. The top and bottom faces of the agitator "sandwich" are of the same polarity and grounded; thus the high potential faces in the middle of the sandwich are shielded and unwanted capacitive coupling with pick-up 19 is minimized. The two discs may be cemented together with conducting paint; a piece of pressure sensitive tape around the circumference will also hold the agitator together nicely. Shielded leads from the audio oscillator are soldered to the top and bottom of the agitator 2 and the high potential lead is soldered to a small projection or tab on the aluminum foil which is elsewhere trimmed to the same diameter as agitator 2. Any good hi-fi cartridge with a flat response in the range 10 to 16,000 c.p.s. will do for the pick-up 19, and either a sapphire or diamond needle will work. The leads from the pick-up and the pick-up itself must be completely shielded. With proper shielding and the oscillator 47, voltmeter 41 and base 11 connected to a common ground it should be possible to place the needle of the pick-up 19 very near (but not touching) the agitator without observing any signal on the most sensitive scale of the voltmeter while the agitator 2 is being driven. A constant, light pressure of the needle of the pick-up against the agitator or against a sample placed on the agitator is provided by the spring or rubber band 33.

Samples of the test materials are placed on the agitator 2. The samples may be of any shape such as a right circular cylinder, cube, cone, etc., but their dimensions must be kept small enough so that the lowest normal (elastic) mode is above about 50,000 c.p.s. The needle of the pick-up 19 is now placed lightly against the side of a sample and the response noted as a function of agitator driving frequency for constant driving voltage as before. With a sample several narrow maxima in the output from the pick-up 19 will be noted and the frequencies at which these maxima occur will vary depending on the exact location of the needle on the sample. With the needle at one spot small weights (1 to 10 grams) may be added to the top of the sample and the resonances will be observed to shift—usually to higher frequencies with added weights.

It might appear that the sample is "bouncing" on the agitator and that this produces an apparent resonance. To eliminate this possibility a second pick-up cartridge 19' can be arranged to have its needle against the sample (not against the agitator as in FIG. 1) near the bottom while the other pick-up 19, fastened to the same post, has its needle near the top of the sample. Then the voltage ratio $E_{top}/E_{bot}$ will give a measure of relative displacement between two points on the sample independent of any surface effect between the sample and the agitator. Resonances are found as before. The outputs from the two pick-ups 19 and 19' may also be connected to vertical and horizontal plates of a cathode ray oscilloscope and changes in phase are then found to occur just at the resonance frequencies. Also 19 and 19' may be interchanged to eliminate differences in their response characteristics, but the resonances are still observed. While the exact frequencies of resonance depend on the treatment (including static load) accorded the sample before testing, in many cases a resonance somewhere between 2000 to 4000 c.p.s. is observed.

Figure 4:
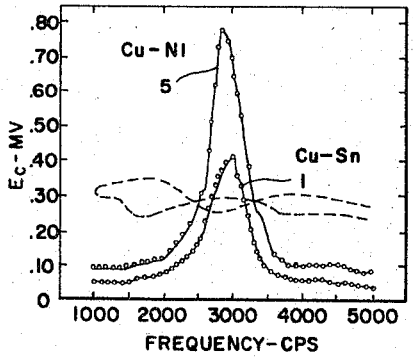
FIGURE 4 is a graph showing the variation of vertical pick-up voltage $E_c$, with respect to frequency of constant amplitude (5.0 volts) driving voltage for a copper-tin poly crystal alloy 1 and a copper-nickel poly crystal alloy 5 whose compositions and descriptions are given in Table I.
Figure 5:
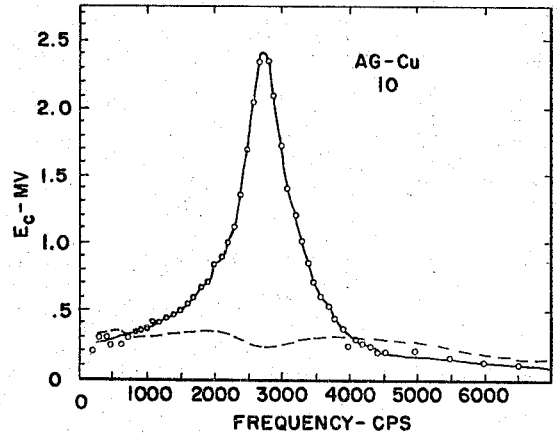
FIGURE 5 is a graph showing the variations of vertical pick-up voltage $E_c$ with respect to frequency of constant amplitude (5.0 volts) driving voltage for a poly crystal silver-copper alloy 10 whose composition and description are given in Table I.

Typical results for some poly crystals are shown in FIGS. 4 and 5 for a copper-tin alloy, a copper-nickel alloy, and a silver-copper alloy. These particular samples were all disc-shaped but of different dimensions, and were tested standing on edge on the agitator 2 with the needle against a flat face. Samples 1 and 5 were merely placed on the agitator 2, but 10 was cemented to the agitator with a little rubber cement because of the difficulty of keeping this thin sample on edge with the needle against its side. As a result, the level of response from 10 was much greater than from 1 and 5 because of better coupling to the agitator. Further information on the samples is presented in Table I; they were chosen particularly since they are readily available (at least in the United States) and represent a relatively inexpensive way for the verification of the existence of audiofrequency resonances in poly crystals.

TABLE I.—DESCRIPTIONS OF POLY CRYSTAL ALLOYS

| Sample No. | Common name | Composition | Prepared by— | Dimensions (inches) | | Weight (grams) | Test [1] position of pick-up needle |
|---|---|---|---|---|---|---|---|
| | | | | Diam. | Thickness | | |
| 1 | Lincoln penny | Cu, 95%; Sn, 5% | U.S. Mint, Denver (1961). | 0.750 | 0.058 | 3.135 | Near p of pluribus. |
| 5 | Jefferson nickel | N , 25%; Cu, 75% | ----do---- | 0.836 | 0.073 | 4.930 | Just above dome of Monticello. |
| 10 | Roosevelt dime | Ag, 90%; Cu, 10% | U.S. Mint, Denver (1962). | 0.704 | 0.045 | 2.522 | On flame of torch. |

[1] Samples were placed on edge on agitator 2 for testing with needle near the top on "tail" side.

If a single crystal of aluminum in the shape of a right circular cylinder (½ in. diam. x ⅝ in. long) is now placed centrally on the agitator 2, and the needle of pickup 19 put in contact with the side of the crystal, one or more resonances or peaks are found in the pick-up voltage, $E_c$, just as for poly crystals. However, when the crystal is driven at one of the resonance frequencies and $E_c$ observed as the crystal sample is rotated with the pickup at a constant height above the base, an extremely asymmetrical or *directional* result is sometimes found as shown in the polar plots of FIGS. 6 and 7 for resonance frequencies of 2800 and 1400 c.p.s., respectively.

The circumferential dependence of the pick-up voltage from the agitator 2 without the crystal is shown by the dashed circle in both figures. The orientation of the crystal sample obtained from X-ray diffraction measurements shows that the observed "beam" directions coincide with one of the projected slip directions <110> of the crystal. The coincidence of beam and slip directions was also found for beams at other frequencies and in two additional aluminum single crystal samples of different dimensions and orientations. Asymmetrical circumferential outputs or beams are observed only at resonance frequencies; beams at different frequencies are not always in the *same* direction, but they are always in *one* of the slip directions of the crystal. The difference in output between opposite sides of the crystal can also be distinguished by using a microphone placed several inches from the sample although the diameter of a usual microphone (1" or more) does not allow the delineation of a definite beam pattern like that found with a needle in contact with the sample. On the other hand, the presence of a resonance can be clearly detected by connecting a microphone output to a vacuum tube voltmeter, or indeed, by placing one's ear close to the sample as the frequency of the driving voltage is varied at constant amplitude. Polycrystalline aluminum samples in the shape of right circular cylinders have also been tested circumferentially but show no pronounced directional effects.

The small dimensions of the samples tested indicate clearly that the resonances can not be accounted for in terms of the usual elastic or vibrational modes of the samples. The results shown in FIG. 6, for example, were obtained from a cylindrical specimen of 0.50 in. diameter x 0.67 in. long. Accordingly the frequency of the lowest elastic mode associated with this sample will be given by $$\nu_o(\text{elastic}) = c_s/\lambda_o \qquad (1)$$
$$= c_s/2L$$
$$= (3.3 \times 10^5)/(2 \times 1.7 \cong 1 \times 10^5 \text{ c.p.s.}$$

where $c_s = 3.3 \times 10^5$ cm./sec. is the transverse (shear) sound velocity in aluminum and $L = 1.7$ cm. (.67 in.) is the largest dimension of the sample. Samples consisting of ¼ in. and ½ in. cubes have also exhibited resonances in the audiofrequency range and of course the lowest normal modes of these are still higher.

On the other hand, both the resonances and the directional effect can be accounted for in terms of internally generated particle (de Broglie) waves propagating in a slip direction. It is pointed out that X-ray diffraction results indicate that real single crystals consist of small, slightly misoriented blocks about $10^{-4}$ cm. across. Such a mosaic structure means that there will be many finite lattice segments of length $S = 10^{-4}$ cm. in both single and poly crystals. As a result it is easily shown that there will be a series of discrete allowed frequencies or modes for particle waves propagating through a crystal. The relation between frequency and wave length for particle waves however is not given by Eq. 1, but instead by $$\nu_o(\text{particle}) = \frac{h}{2m\lambda_o^2} \qquad (2)$$
$$= \frac{h}{2m(2s)^2}$$

where $h$ is Planck's constant, $m$ is the mass of the lattice atom in a mono-atomic crystal, and S is the internal segment length. Using a value of $1 \times 10^{-4}$ cm. for S gives for aluminum $$\nu_o(\text{particle}) \cong 1.8 \times 10^3 \text{ c.p.s.}$$

which is in the right range. Further, it is noted that the existence of modes is equivalent to standing waves made up of direct and reflected waves with the reflected wave shifted in phase 180°. Hence, if a direct particle wave arrives at one side of a single crystal in phase with the translational vibration of the crystal as a whole, the reflected wave will arrive at the opposite side out of phase or vice versa. Thus, one can expect a reenforcement on one side and a cancellation on the other in agreement with the results depicted in FIGS. 6–7. The relation of Eq. 2 is that for a particle and its associated wave in a field-free region and the crystal lattice actually provides a region of periodically varying potential. If the wave length associated with the particle is much greater than the period of the oscillating potential, however, the crystal will appear to be field-free. This means that the wave length, λ, under consideration must be much larger than the crystal spacing, viz.

$$\lambda \gg 2d$$

which is indeed the case for $\lambda = 2 \times 10^{-4}$ cm. since the interatomic distance in the slip direction is about $3 \times 10^{-8}$ cm. for most crystals ($d = 2.86 \times 10^{-8}$ cm. for aluminum).

In addition to the results already cited, resonances have been found by this method in samples of sodium chloride single crystals, copper single crystals, quartz single crystals, and in polycrystalline lead, beryllium, stainless steel, zinc, and many other materials. Resonances have also been observed in crystalline polymers like polyethylene and polytetrafluoroethylene. Directional beams were observed in copper single crystals. Hence, the results cited are merely examples and apply generally to many types of materials.

The agitator need not necessarily be a piezoelectric disc, but can consist of any means for producing mechanical oscillations or vibrations in the crystal. For example, an electromagnetic agitator has been used in which alternating current is passed through a small coil which is situated in an annular gap where a strong magnetic field exists. Magnetostrictive, electrostatic or purely mechanical means for producing vibrations are equally effective. Similarly the detector may employ an electromagnetic or capacitive (electrostatic) pickup; optical means for detecting the vibrations at any point on the surface of the sample may also be used and it has already been mentioned that the presence of resonances and the existence of directional beams can be noted by means of a microphone placed near the sample.

Further it is obvious that the apparatus can easily be made automatic by means of a motor drive on the oscillator and a recording voltmeter so that resonance curves of the type shown in FIGURES 4 and 5 giving pickup voltage, $E_c$, vs the driving frequency can be automatically traced on a chart recorder. The crystal sample can also be stationary and the pickup rotated thereabout and polar plots like those of FIGURES 6 and 7 automatically recorded on suitable charts. After each rotation the pickup needle can be automatically raised or lowered to a new vertical height above the agitator and the response of the entire surface of the crystal recorded for a single vibration frequency or for many such freqeuncies.

Figure 8:
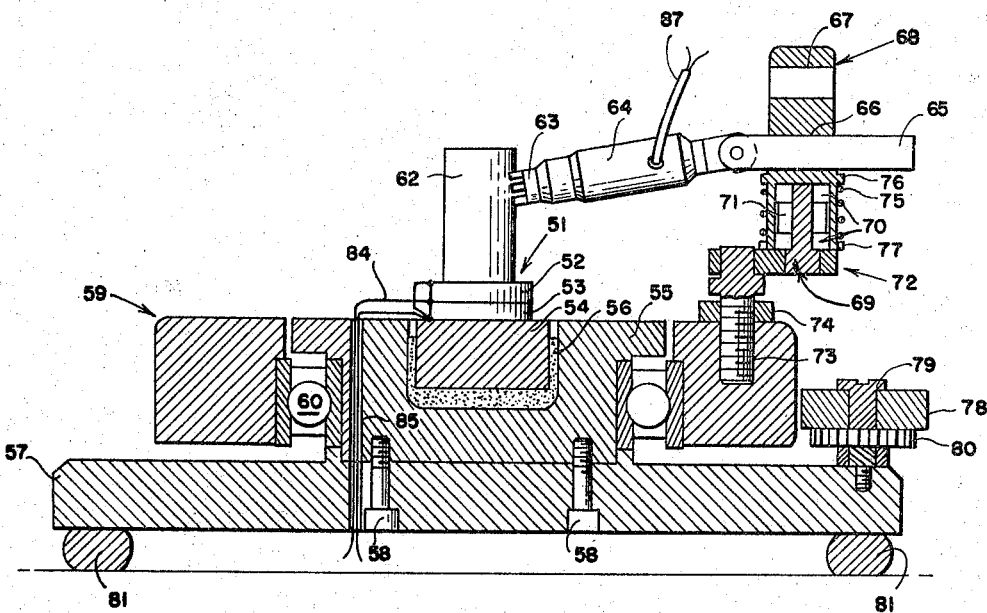
FIGURE 8 is a view similar to that of FIGURE 1 of a modification thereof.
Figure 9:
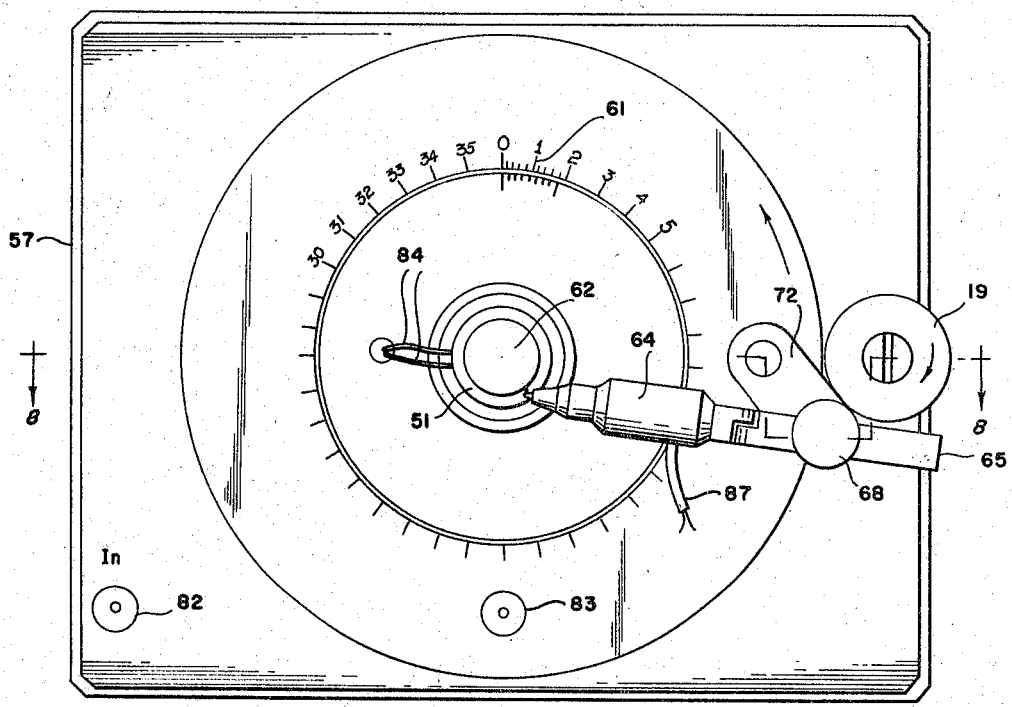
FIGURE 9 is a top plan view of the modification illustrated in FIGURE 8.
Figure 10:
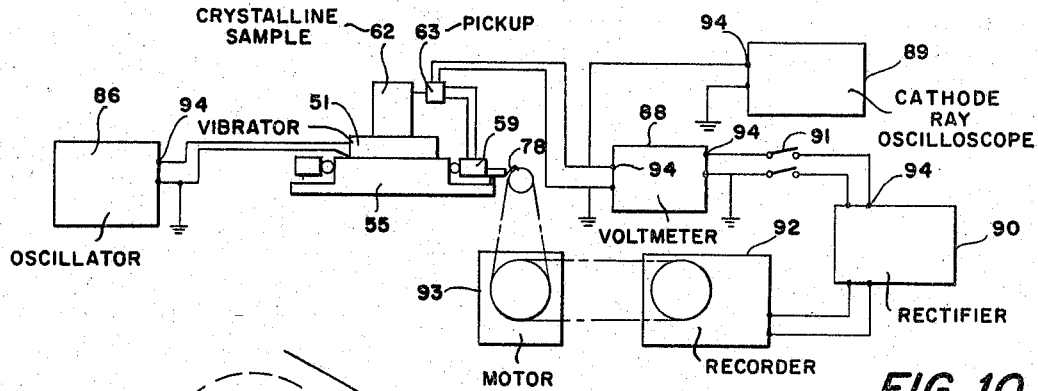
FIGURE 10 is a diagrammatic view showing the connections between the modification of FIGURES 8 and 9 and the several components for producing and detecting oscillations.

Proceeding next to FIGURES 8 through 10, there is shown a modification of the apparatus of FIGURES 1 through 3 wherein the crystal sample can be maintained stationary and the pickup rotated about the sample.

The modified apparatus comprises a piezoelectric agitator or vibrator 51 consisting of two discs of barium titanate as previously described. In the apparatus of FIGURE 8 the inner faces of the discs 52 and 53 are connected to the high potential side of a source of electric voltage and the two outer faces are grounded. A single disc may also be used as an agitator with its high potential base on the bottom. The agitator is placed upon an isolating block 54 which is coupled to the mounting block 55 only through a gel-like substance 56 which provides for both mechanical and electrical insulation of the isolating block 54 from the rest of the apparatus. The mounting block 55 is fastened to a base plate 57 by means of socket head screws 58.

A mounting ring 59 is rotatably mounted around the mounting block 55 by means of ballbearing 60. The inner circumference of the mounting ring 59 is marked off or graduated at 2° intervals as indicated at 61 in FIGURE 9.

Mounted upon the agitator 51 is a suitable poly or single crystal sample 62 which has the shape of a right circular cylinder although any other shape samples may be used. A ceramic phonograph pickup cartridge 63 is positioned in a horizontal position adjacent the sample 62 so that its pickup needle is engageable with the circumferential surface thereof. The pickup cartridge is surrounded by a metal housing 64 providing for electrostatic shielding and positioning of the pickup needle against the sample by means of an adjustable connection to the support rod 65. The support rod 65 is slidably mounted in either of two holes 66 or 67 in the post 68. The post 68 is mounted to freely rotate around a spindle 69 by means of ballbearings 70 spaced by a spacer 71. The spindle 69 is mounted in an arm 72 which is rotatably mounted on the upper end of an adjustable base 73 which may be locked in position by a locking nut 74.

A coil spring 75 is placed around the post 68 between two flanges 76 and 77 on the post 68. The spring 75 causes the post 68 to rotate so as to bring the needle of the pickup 63 into light contact with the face of the sample 62.

A friction drive wheel 78 is rotatably mounted upon a fastening screw 79 by means of which the mounting ring 59 may be rotated relative to the base plate 57, the mounting block 55 and as a result the sample 62. The drive may be operated manually or motor driven by means of a gear 80 provided for this purpose.

Base plate 57 is mounted upon rubber pads 81 in order to isolate the apparatus from random building vibrations. An input terminal connection 82 is provided on the upper surface of the base plate 57. There is a threaded hole 83 provided in the mounting ring 59 to allow for a second post arm 68 and pickup assembly so that the vibration at two points on the surface of a sample can be observed simultaneously and compared.

Extending from the faces of the agitator 51 are leads 84 which extend downwardly through a passage 85 within the mounting block 55 and the base plate 57. The leads 84 are connected to the terminal connector 82 and then to an electric audio oscillator 86 which drives the agitator 51 at various vibration frequencies.

Extending from the metal housing 64 of the pickup cartridge 63 are shielded leads 87 which are connected to a sensitive vacuum tube voltmeter 88 used to detect the signal voltage produced in the pickup 63 by vibration. A cathode ray oscilloscope 89 is connected to the voltmeter 88 in order to obtain the wave form as well as amplitude of the electrical signal from the pickup 63. A rectifier 90 is connected to the output of voltmeter 88 by a switch 91 and changes the A.C. signal from the voltmeter to a D.C. signal for input to the chart recorder 92. The variable speed motor 93 is connected to simultaneously drive the chart recorder 92 and the friction drive 78 of the particle wave apparatus so that the pickup voltage is automatically recorded as a function of angular rotation of the pickup needle around the circumference of the test sample at a fixed position above its base.

The circles around the terminals in FIGURE 10 indicated at 94 refer to electrostatic shielding.

Use of the apparatus as a (mechanical) vibration or sound amplifier is demonstrated by the results in FIGURE 5 where the amplitude of vibrations applied to the base of the crystal is increased at a position near the top of the crystal by a factor of almost ten in the vicinity of 3000 c.p.s. The resonance frequency is shifted by the addition of very small weights (loads) or variations in the previous loading history of the crystal as already mentioned. Hence to obtain amplification over a wide frequency range like that shown in FIGURE 5 for 3000 c.p.s. it is only necessary to arrange a number of crystals of the same size in parallel with each "tuned" to a slightly different frequency. Amplification of the vibrations requires an input of energy which in this instance is supplied by the prestressed or loaded crystal. That is the energy of uni-directional or steady mechanical deformation (plastic flow or slip) is converted into oscillatory vibrations which reenforce and thus amplify the vibrational input to the crystal. In this respect the crystal acts like a "mechanical" battery which is "charged" by the application of steady (non-oscillatory) loads. The loads are non-power consuming and tend to produce deformation of the crystalline material.

In order to convert a mechanical vibration amplifier such as that described above into a vibration oscillator one need only provide for a feedback of some of the amplified output vibrations into the input side of the crystal (with the proper phase relations) to produce sustained oscillations. Such feed-back may be directly mechanical or may be indirect, e.g., electrical, as demonstrated in FIGURE 16. Such an oscillator essentially comprises two small coils fastened to each end of a crystal and the crystal mounted so that the coils are in separate annular gaps in magnetic fields produced by a permanent magnet. Then if vibrations are produced at one end by passing an alternating electrical current through the coil, a voltage will be produced at the other end, and will be quite large at a resonance. If part of this voltage from the second coil is now applied (in phase) with the driving current in the first coil the vibrations will be enhanced. Finally, the original driving current may be completely turned off, whereupon the vibrations will continue as self-sustained oscillations. In order to provide a source of energy for the oscillations the crystal must be stressed, but the load can be applied in the direction of the vibrations as shown in FIGURE 14. Further, an external starting current is not necessary if the oscillator is tuned properly; a slight tap is sufficient to initiate oscillations. Feedback in this type of system may be through an external electrical transformer. Two separate coils may also be wound on the driven end and one used to provide feedback while the other is used as a source of electrical oscillations (electrical oscillator).

A specific embodiment of such an oscillator is illustrated in FIGURES 14 through 18 and indicated generally at 95 in FIGURE 14. The oscillator comprises a stainless steel base frame 96 in which is mounted a soft iron frame or magnet housing 97 for housing the magnet 98. The purpose of the frames is to provide a path for the magnetic flux from permanent magnets 98. Four threaded studs 99 are also mounted in the base 96.

The magnets 98 are permanent magnets of cylindrical form magnetized in their axial directions. Alnico V or another suitable permanent magnet material may be used. Ring-shaped outer pole pieces of soft iron 100 are used to provide a path for the magnetic flux from permanent magnets 98 and to form an annular gap with radial magnetic flux B in the gap.

Cylindrical inner pole pieces of soft iron 101 are positioned adjacent the permanent magnets 98 and receive magnetic flux from the outer ring-shaped pole pieces 100 across the annular air gap and thus complete the magnetic circuit. A driving element 102 is positioned between the inner pole pieces 101 in a manner to be presently described and is machined in one piece from aluminum, beryllium, magnesium or other like metals. The driving element may also be formed from non-metallic material or made in three pieces and cemented together as will be later described. Single or polycrystalline materials may be used. Compression springs 103 wound from spring brass or Phosphor bronze wire are cemented betwen the pole pieces 101 and the ends of the driving element 102. The springs 103 are centered by tubular aluminum inserts 104 pressed into the inner pole pieces 101. Non-conducting cylindrical coil forms 105 of coated paper are cemented to the driving element 102. An input or driving coil 106 is wound on the lower end of the driving element 102. Fine wire of enameled copper or anodized aluminum may be used (e.g., No. 34 to 36 B&S gauge wire). An output coil 107 is provided on the upper end of the driving element and is wound similarly as the input coil 106. Both coils 106 and 107 are wound and cemented on the cylindrical coil forms 105.

The upper magnet assembly indicated generally at 108 is mounted on the upper ends of the studs 99. This assembly comprises a stainless steel mounting plate 109 having holes through which the four studs 99 slide. Eight nuts 110 are provided by means of which the upper magnet assembly may be raised and lowered with respect to the lower magnet assembly and the compressive tension in the springs 103 (and thus the narrow center part of the driving element 102) adjusted accordingly.

Proceeding next to the block diagram of electrical connections of FIGURE 16, shielded leads 111 extend from output coil 107 to a high impedance winding 112 of a transformer 113. Shielded leads 114 connect the input coil 106 to a low impedance winding 115 of the transformer 113 so as to feed back to the input coil 106 a part of the E.M.F. generated across the high impedance winding from the motion of the coil 107 in the magnetic field as will be subsequently explained.

116 is a low impedance winding of the transformer 113 across which a part of the output voltage across 116 is available for external use at the oscillator output terminals 117.

Proceeding next to FIGURES 17 and 18, there is shown a modification of the driving element of FIGURE 14 and indicated generally at 102'. In this modification the driving element comprises a three-piece assembly in which the active section indicated at 118 may be varied independently of the end coil assemblies. The input or driving coil assembly 106' comprises a paper coil form 119 and overlaps strip 120 for cementing the paper coil form to the driving element 102' and a coil 121 mounted on the paper coil form 119.

Similarly, the output coil assembly 107' comprises a paper coil form 122, and overlaps strip 123 for cementing the paper coil form to the driving element 102' and an output coil 124 mounted on a coil form 122.

An important feature of this three-piece driving element is that the section 118 may consist of a single crystal with an active slip direction along the axis of 118 so that the internally generated vibrations from particle waves will all lie in the direction to produce maximum axial vibration (and hence generated E.M.F.) of the driving element. With a polycrystalline active element many of the internal vibrations will have components perpendicular to the vibration axis of the assembly and thus not contribute to the amplification.

In FIGURE 19 there is shown a modified circuit which is an improvement over the circuit over FIGURE 16 since greater efficiency is obtained by having the electrical output tuned as well as the mechanical circuit.

In FIGURE 19 a capacitor 125 with a value $C_2$ is placed across the winding 112 (which has electrical inductance, $L_2$) such that the parallel circuit formed by 125 and 112 is in electrical (parallel) resonance at the frequency operation $\omega_0$, i.e., $$\omega_0 L_2 = 1/\omega_0 C_2$$

Under these conditions the current through the output coil 107 will be a minimum at the operating frequency, $\omega_0$. Further, a capacitor 126 with value $C_1$, is placed in series with the feed-back winding 115 and the input coil 106. The value of $C_1$ is selected so that the circuit formed by 126 and the coil 106 (with inductance, $L_1$) is in electrical *series* resonance at the operating frequency, i.e., $$\omega_0 L_1 = 1/\omega_0 C_1$$

Under these conditions the current through the input coil will be a maximum for a given voltage across 115 at the operating frequency.

With respect to the operation of the particle wave oscillator 95, the mechanical elastance, $S_m$, of each of the springs 103 is chosen so that $S_m = \omega_0^2 M$ where M is one half the mass of the driving element 102 and $\omega_0 = 2\pi \nu_0$ where $\nu_0$ is the operating frequency of the oscillator (e.g., 3000 c.p.s.). The mechanical impedance of each of the coil assemblies 106 and 107 will then be a minimum at frequency, $\nu_0$, and consist almost entirely of a mechanical resistance, $R_m$, due to air resistance or friction and a small internal friction of the springs 103. The entire assembly may be enclosed in a vacuum-tight housing or tube (not shown) to reduce $R_m$ to its lowest possible value.

The compressive force exerted by the springs 103 on the narrow, central or active section of the driving element 102 is next adjusted so that the internal particle wave resonance frequency, $\nu_p$, is also 3000 c.p.s. as given by Eq. 2 above. This may be accomplished by lowering or raising the upper magnet assembly 108 until the deflection, $x_0$, of the springs is such that the necessary force, F, is exerted on the driving element (active section) 102. This force can be adjusted independently of $S_m$ since according to the usual spring relation $$F = \frac{x_0}{S_m}$$

That is, changes in F can be made by changing $x_0$, with $S_m$ fixed at the proper value for resonance. The force on 102 causes a (small) unidirectional plastic deformation or contraction during which internal particle waves are produced in the driving element. This produces vibrational forces and torques in the crystal lattice which cause an enhancement of the external vibrations which are therefore magnified. A part of the enhanced output from coil 107 can now be fed back to the input coil 106 to produce self-sustained oscillations. The energy source is the unidirectional spring deformation which is converted into vibrational energy internally in the crystalline driving element as a result of the particle waves generated during plastic flow of the crystal. The relevant equations for the apparatus of FIGURES 14–18 are:

$$f_1 = B_1 l_1 i_0 \sin \omega t \tag{3}$$

$$e_2 = B_2 l_2 v_0 \sin (\omega t - \delta) \tag{4}$$

$$y_m = v_2 / f_1 \tag{5}$$

$$i_1 = i_0 \sin \omega t \tag{6a}$$

$$v_2 = v_0 \sin (\omega t - \delta) \tag{6b}$$

where $f_1$ is the force producing vibration.

$B_1$ is the magnetic flux density of the gap in which the first coil is located.

$l_1$ is the length of wire in the first coil.

$i_1$ is the alternating current supplied to the first coil (by feed-back from the second coil).

$v_2$ is the alternating velocity of the second coil which is greater than that of the first coil because of the amplifying properties of the crystal produced by particle waves in the loaded crystal.

$B_2$ is the magnetic flux density of the gap in which the second coil is located.

$l_2$ is the length of wire in the second coil.

$y_m$ is the effective mechanical admittance of the crystal and is large near a resonance frequency.

$\delta$ is a possible phase shift between the applied current in coil 106 and the velocity of coil 107.

It is obvious that other means of feedback and different kinds of agitators such as piezoelectric, magnetostrictive, etc. can be used in a similar way and that the vibration agitator and indirect feedback device need not necessarily be of the same kind. Thus an electromagnetic feedback coil can be used to supply voltage to a piezoelectric agitator, etc.

The use of piezoelectric, electromagnetic, or similar pickups clearly allows for use of the device as an electrical oscillator or amplifier where again the energy source is the loaded or deformed crystal instead of a chemical battery or other power supply.

Figure 6:
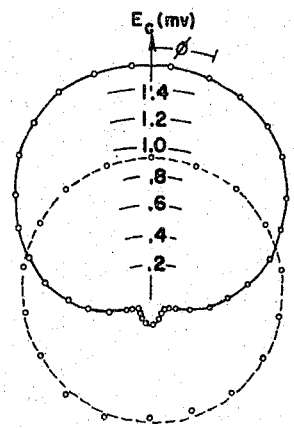
FIGURE 6 is a polar graph of the vertical pick-up voltage $E_c$ against angle position $\phi$ for a cylindrical aluminum single crystal specimen at 2800 c.p.s. and 25° C. tested as in FIGURE 4.
Figure 7:
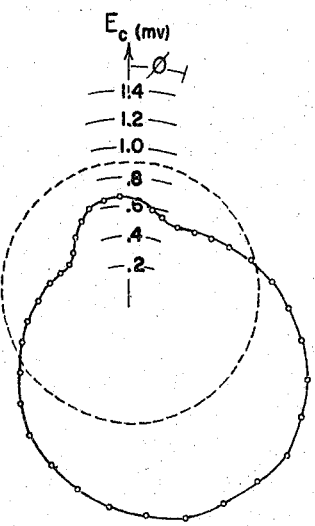
FIGURE 7 is a polar graph of vertical pick-up voltage $E_c$ against angular position $\phi$ for the aluminum single crystal specimen of FIGURE 6 at 1400 c.p.s. and 25° C.

The use of the apparatus to allow orientation of single crystal samples is indicated by FIGURES 6 and 7 where the directional results can be used to locate a slip direction (i.e., direction of closest spacing) in the crystal and thus the orientation of a single crystal of any known material determined. Such determinations can be made completely automatic by the use of chart recorders and motor drives for rotating the sample as previously discussed.

The use of the apparatus as a source of directional sound beams in air is also demonstrated in FIGURES 6 and 7, and by the fact already mentioned that a microphone pickup indicates more sound from one side of the crystal than from the other. The sound waves are transmitted in air by coupling with the vibrating surface of the single crystal and it is obvious that the intensity of such airborne sounds can be increased by providing vanes or other means for better coupling. The propagation of such directional sound beams in water and other liquids and gases is also possible if provision is made for coupling of the appropriate vibrating crystal surface to the medium in question. The directional properties of a single crystal beam may be intensified by the use of two or more sets of crystal-agitator units as depicted in FIGURE 11 where 3 such units and their combined pattern in air are drawn. In order that the beams be in the proper phase or time relation to each other it is necessary to have separate agitators for each crystal so that the phase of each can be adjusted to synchronize to a common value. The beams can be made to cover a wide-frequency range by using sets of crystals tuned (by variation of load) to different frequencies.

Conversely, if the crystal and a detector or array of such units are placed in a vibrating medium the vibrations of the medium will be amplified and made capable of detection by the apparatus or apparatus array acting in the opposite sense to that previously discussed.

In order to demonstrate how the apparatus may be used to provide increased understanding and knowledge of the structure of solids and to determine new mechanical constants of solids for correlation with the strength (i.e., fracture and flow stresses) of solids attention is called to FIGURES 12a and 12b in which external and internal free particles respectively are represented as impinging on a periodic crystal structure or region of periodically varying potential, $V(x)$, such that $$V(x) = V(x+d)$$

It is known that external beams of particles incident on crystals as shown in FIGURE 12a are diffracted like waves and in fact exhibit certain wave-like properties with a wavelength, $\lambda$, given by the de Broglie relation $$\lambda = \frac{h}{mv} \quad (7)$$

which $h$ is Planck's constant, $m$ is the mass of the particle and $v$ is its velocity. Various particles have been used to demonstrate these wave effects including electrons, neutrons, protons and whole atoms and molecules such as H, $H_2$, He, $As_4$, Cd, Zn, and Ag. Now, however, this idea is extended to the *internal* generation of such waves as a result of the acceleration of atoms in narrow field-free regions *in* a crystal when an external mechanical load is applied to the crystal. Such a situation is indicated in FIGURE 12b. Further, the process of plastic deformation or slip in crystalline solids is one in which rows of field-free atoms like the one shown in FIGURE 12b move through the solid as particle waves. In order to demonstrate more clearly the process of particle wave propagation in a crystal lattice a certain lattice segment of length $S = Nd$ is considered where $d$ is the lattice spacing of a monatomic crystal in a particular direction. Such a segment is shown schematically in FIGURE 13. If $\psi_n$ is some measurable property of a lattice which can be measured at the lattice sites but not elsewhere, then $\psi_n$ is propagated as a wave if a differential equation for $\psi_n$ can be set up (on a physical basis) with a solution of the type $$\Psi_n = A e^{i(2\pi \nu t - knd)} \quad \text{(running wave)} \quad (8)$$

or $$\Psi_n = [A_1 e^{iknd} + A_2 e^{-iknd}] e^{-i2\pi \nu t} \quad \text{(standing wave)} \quad (9)$$

where $\nu$ is frequency and $k = 2\pi/\lambda$ is the wave vector. In view of the origin of particle waves momentum is selected as the property to be propagated or transferred through the lattice by a particle wave. Then if a general point $n$, of the lattice segment of FIGURE 13 is selected, the principle of conservation of momentum requires $$m = \frac{\partial v_n}{\partial t} = K_p[(v_{n-1} - v_n)] - [K_p(v_n - v_{n+1})] \quad (10)$$

where $m$ is the mass of the atoms in the lattice; $v_{n-1}$, $v_n$, $v_{n+1}$, are the velocities of the $n-1$, $n$, and $n+1$ masses in the lattice; and $$K_p$$

is a new quantity, the momentum transfer constant for the lattice. For a segment with fixed ends a solution to Equation 10 is given by:

$$v_n(t) = [B_1 e^{iknd} + B_2 e^{-iknd}] e^{-i2\pi \nu t} \quad (11)$$

where the conditions that the ends are fixed $$v_0(t) = 0; \quad v_n(t) = 0 \text{ for all } t$$

requires that $$B_1 = -B_2$$

so that $$v_n(t) = B1 e^{-2\pi \nu t} 2i \sin knd \quad (12)$$

and also $$\sin kNd = 0$$

or $$kNd = q\pi$$

$$k = \frac{q\pi}{Nd}$$

where $q$ is an integer; $q = 1, 2, 3 \ldots (N-1)$. Hence discrete values of wave vector $k$, are required.

Differentiation of Equation 11 and substitution into Equation 10 gives the condition on $\nu$ for the solution, viz:

$$\nu_p = \frac{2K_p}{\pi m} \sin^2 \frac{kd}{2} \quad (13)$$

where $K_p$ is the magnitude of the momentum transfer constant $$K_p$$

Since only discrete values of $k$ are allowed it is clear that only certain discrete values of frequency, $\nu_p$, will occur in accordance with the experimental results already cited. In order to predict the magnitudes of the particle wave frequency modes, however, a value for $K_p$ must be known.

To find $K_p$, it is recalled that at low values of $k$ (large $\lambda$) the periodic crystal field of spacing $d$, can have little or no effect on the wave, which then must act as if it were in a field-free region. Thus, 17 is required that the expression for $\nu_p$ given by Equation 13 must reduce to the $\nu-k$ relation for a free particle; that is, $$\nu_p \text{ (lattice)} = \nu_p \text{ (field-free) for small } k$$

Hence $$\nu_p \text{ (lattice)} = \frac{2K_p}{\pi m} \sin^2 \frac{kd}{2} \simeq \frac{2K_p}{\pi m} \left(\frac{kd}{2}\right)^2 \quad (13')$$

since $$\sin \frac{kd}{2} = \frac{kd}{2} \text{ for small values of } k$$

The relation between $\nu_p$ and $k$ for a free particle is $$\nu_p \text{ (free)} = \frac{\hbar}{4\pi m} k^2 \quad (14)$$

Equating Equations 13' and 14 gives $$K_p = \hbar/2d^2 \quad (15)$$

so that the momentum transfer constant is known.

From Equation 15 it is noted that the momentum transfer constant is greatest in the direction of smallest spacing (smallest $d$) in a crystal. This is in agreement with the well-known experimental fact that plastic deformation or slip in crystals always takes place most easily in the directions of closest spacing.

Returning to the discrete values of $\nu_p$ in the lattice predicted by Equation 13, it is now seen that the lowest frequency will be given when $q=1$ or $k=\pi/Nd$ so that $$\nu_p \text{ (min.)} = \frac{h}{2m}(2S)^2 \quad (2)$$

as indicated earlier.

Further, it is noted from the shape of the $\nu_p$ vs $k$ relation of Equation 13 that equally spaced, discrete values of $k$ will produce closely spaced frequency modes at both ends of the spectrum with a lower density of modes in the middle region. Thus accumulations of modes at audio-frequencies and at frequencies of about $10^{10}$ c.p.s. will occur.

Changes in resonance frequency with mechanical load must occur as a result of changes in the effective segment lengths, S, into which all real crystals are divided. Since it is known that the irregularities or defect structures of crystalline solids play a vital role in determining their strength, a knowledge of the particle wave frequency spectrum will clearly be of value in connection with practical mechanical properties.

In view of the foregoing, and, in particular, Equation 13 giving the relationship between particle wave frequency $\nu_p$, and wave vector $k$, it is apparent that a negative resistance particle wave oscillator in which feedback is not needed can be developed. This can be seen by means of the following discussion: If the plastic deformation of a crystal takes place as a wave process, then the deformation rate or velocity will be proportional to the group velocity of the individual particle waves associated with each atom contributing to the deformation. The group velocity of a wave is, in turn, defined by $$v_g = 2\pi \frac{\partial \nu_p}{\partial k} \quad (16)$$

from Equations 13 and 15 this results in the expression below for $v_g$;

$$v_g = \frac{h}{\pi md} \sin \frac{kd}{2} \cos \frac{kd}{2} \quad (17)$$

so that if $v_g$ is plotted against $k$ a curve is obtained as in FIG. 20 with a maximum in $v_g$ occurring at $k=\pi/2d$.

$$v_g \text{ (max.)} = \frac{h}{\pi 2md} \quad (18)$$

If one now considers an internal free particle in a field-free region as shown in FIGURE 12b, then the final velocity, $v_l$, of the particle just before it leaves the field-free region and enters the lattice as a wave will depend on the force, $F_i$, on the particle according to $$F_i s = F_i pd = \tfrac{1}{2} m v_i^2$$

or $$F_i = \frac{1}{2p} \frac{m}{d} v_i^2 \quad (19)$$

The relation between the wave vector, $k$ $(2\pi/\lambda)$ and $v_l$ is, for the free particle $$v_i = \frac{\hbar}{m} k \quad (20)$$

so that $$F_i = \frac{1}{2p} \frac{m}{d} \left(\frac{\hbar}{m}\right)^2 k^2 \quad (21)$$

$$= \alpha^2 k^2$$

or $$k = \frac{\sqrt{F_i}}{\alpha} \quad (22)$$

where $$\alpha^2 = \frac{h^2}{2pmd} \text{ or } \alpha = \frac{h}{\sqrt{2pmd}}$$

Upon substitution of $k$ from Equation 22 into Equation 17 there is obtained a relation between group velocity and force on a particular atom in the crystal, viz.

$$v_g = \frac{h}{\pi md} \sin\left(\frac{d}{2\alpha}\sqrt{F_i}\right) \cos\left(\frac{d}{2\alpha}\sqrt{F_i}\right) \quad (23)$$

$$= \frac{h}{\pi md} \sin b\sqrt{F_i} \cos b\sqrt{F_i} \quad (24)$$

where $b = d/2\alpha$.

If a plot of $F_i$ vs $v_g$ is now made as shown in FIG. 21 we notice that there is a region or range of values of $F_i$ where the $F_i$ vs $v_g$ slope is negative, i.e., a region of negative differential mechanical resistance. From this it follows that a mechanical negative resistance oscillator can be devised if a suitable arrangement of a mass, spring, and a negative resistance crystal element is found to form an equivalent mechanical circuit such as illustrated in FIG. 22a. The circuit of FIG. 22a is, of course, one in which sustained oscillations will occur in the parallel branch AB if $\rho_m$ is a negative differential resistance device. A mechanical arrangement equivalent to the circuit of FIG. 22a is shown schematically in FIG. 22b. The conditions for sustained velocity oscillations (and hence displacement oscillations) in the circuit of FIG. 22a are easily found from standard circuit analysis to be:

$$\rho_m = \frac{dF_i}{dv_g} \leq -\frac{MS_m}{R_m} \quad (25)$$

where M is mass shown in FIG. 22b; $S_m$ is the elastance of the spring, and $R_m$ is a mechanical resistance due to air friction and/or internal friction or damping in the spring. The frequency of the oscillation is given by $$2\pi\nu_0 = \sqrt{\frac{(R_m + \rho_m)}{M\rho_m}S_m - \frac{1}{4}\left(\frac{R_m}{M} + \frac{S_m}{\rho_m}\right)^2} \quad (26)$$

$$= \sqrt{\frac{S_m}{M}} \quad (27)$$

for $R_m \ll \rho_m$ and $\rho_m = -\frac{MS_m}{R_m}$

Several mechanical structures equivalent to the circuit of FIGURES 22a and 22b are shown in FIGS. 23–26. In these structures the mass, M, and spring elastance, $S_m$, can be varied within certain limits to obtain different frequencies as given by Equation 21 provided that the product $MS_m$ is kept within a range to satisfy the negative differential resistance condition expressed in Equation 19. The static extension or compression of the spring must likewise be maintained at a value which will produce a load on the crystal element such that the region of negative resistance in the F vs. $\nu_g$ curve for the atoms in the crystal is in operation.

The mechanical negative resistance oscillator of FIGURES 23 and 24 comprises a stainless steel housing or frame 127 which is substantially cup-shaped as may be seen in FIGURE 24. The side walls of the frame 127 are indicated at 128 and have threaded therein hexhead machine screws 129 by means of which support threads 130 are fastened to the housing. Each of the screws 129 has an axial hole therethrough with the support thread passing through the hole and tension in the thread being adjusted by turning the screw. The support threads 130 are attached to a mass element 131 which is in the form of a ring and accordingly prevents swaying or side motion of this mass element. A coil spring 132 is in tension between the mass element 131 and the top of a crystalline element 133, thereby producing a compressive load on the crystalline element. The coil spring 132 is extended in tension as a result of the gravitational force on the mass element 131. The mass element 131 and the spring 132 constitute the mechanical parallel resonance means.

The crystalline element 133 is loaded to a level so that the narrow section 134 exhibits a mechanical negative differential resistance $p_m$ (negative slope in load vs. *rate* of deformation). It is the unidirectional energy of deformation of the crystalline element 133 under the load produced by the mass element 131 that is the source of energy for the oscillations of the mass element 131 and the spring element 132.

Proceeding next to FIGURES 25 and 26, there is illustrated therein a modified oscillator comprising a base plate 135 positioned upon rubber mounts 136 to isolate the base plate from building vibrations. In the center of the base plate 135 there is mounted a crystalline element 137 loaded to a level so that the active section 138 thereof exhibits a negative mechanical differential resistance. Positioned upon the top of the crystalline element 137 is a thin leaf or strip spring element 139 made from a thin sheet of spring bronze or steel to form the mechanical parallel resonance means. This spring element 139 is initially curved upward slightly so that if it is just on the horizontal under the load imposed by the force of gravity acting downward on a mass element 140. The mass element 140 is in the form of a ring made from stainless steel or other suitable material. The spring 139 and the mass element 140 constitute the mechanical parallel resonant means and also provides for the load on the crystalline element 137.

In order to obtain electrical oscillations from the negative resistance mechanical oscillators shown in FIGURES 23 to 26 a coil may be attached to the mass elements so as to oscillate transversely to magnetic flux lines in an annular gap and thus generate a voltage according to Equation 4. This can be carried out by fastening circular forms of paper or other light-weight non-conducting materials to the mass elements 131 and 140 and then winding coils of fine wire on these forms so that an alternating electrical voltage will be produced when a magnetic field is provided with flux lines cutting the turns of wire of the coil.

Proceeding next to FIGURES 27 and 28, the modification illustrated therein eliminates the magnet by employing a piezo-electric bilaminate as the spring element. In this modification the elastance of the bilaminate strip or spring provides the spring elastance $S_m$ and flexing of the strip produces a voltage across the silvered faces of the laminates which may be of suitably oriented quartz or other piezoelectric material. The oscillator of FIGURES 27 and 28 comprises a base or mounting 141 upon which a negative mechanical resistance element 142 is mounted. The element 142 is a poly or single crystal element of rectangular cross-section. A bilaminated piezoelectric strip 143 is mounted on the top of the crystal element 142 by means of a thin clamp 144 secured to the crystal element 142 by machine screws 145 that may be seen in FIGURE 27. The strip 143 acts as a spring element ($S_m$) in flexure. The strip 143 comprises two thin strips of quartz (e.g. +5° LR X-cut) with silvered faces as electrodes and cemented together so that any bending or flexing of the combined strip produces a voltage across the inner (high potential) and outer (grounded) faces.

To mass elements 146 of stainless steel or other material are fastened to the outer ends of the laminated piezoelectric strip 143 to form the mass element of the mechanical parallel resonance means and to provide the necessary load on the crystal element 142. Electrical connections 147 extend from the inner and outer faces of the composite strip 143 across which an alternating EMF appears when the strip-mass system oscillates.

It is apparent that the strip 143 serves a dual purpose: first, it acts as the spring element ($S_m$) to provide a mechanical parallel resonance circuit with the mass (M) element 146; second, it provides a means by which the mechanical oscillations are converted to electrical signals appearing as an alternating voltage across the leads 147.

From the foregoing description it must be clear that particle waves may exist in all materials under load, but that materials in which there exists some degree of regularity in the interatomic spacing will tend to have accumulations of particle waves of the same or a few definite frequencies rather than a completely random distribution of frequencies. Such materials may be defined as *crystalline* and include, but are not confined to regular three-dimensional periodic structures called single crystals or poly crystals. Thus materials which are regular in only two dimension or one dimension are considered as crystalline in this sense. Further any materials originally of random atomic structure in which orderly, periodic arrangements of atoms may be brought about by thermal, electrical, magnetic, chemical, mechanical or other means will become crystalline materials in the sense used herein and in the following claims. An example is that of lightly vulcanized natural rubber (hevea) which has an amorphous (random) atomic structure at room temperature, but which becomes partially crystalline at low temperatures. This same rubber compound also becomes crystalline even at room temperature when stretched to elongations above about 300%. Vibration measurements of the type previously described reveal no particle wave resonances at audio-frequencies in such rubber compounds when unstretched and at room temperature, but audio-frequency resonances are found in natural rubber stretched above 300% at room temperature and in unstretched natural rubber at low temperatures ($\sim$ −25° C.).

In a material already crystalline a combination of steady (or slowly varying) load and vibration is necessary to produce enhanced or resonant particle waves and the load and vibration frequency must be chosen in proper relation for resonant particle waves to occur. This follows since loads of varying magnitudes produce particle waves of different frequencies in the material and resonant or enhanced particle waves will be produced only when the material is vibrated at one of the particle wave frequencies characteristic of a particular load. Since the particle waves may persist for some time after imposition of a load, however (delayed deformation) the load does not necessarily have to be concurrent with the vibration, i.e., preloaded materials may be used wherein residual stresses remain.

Another effect of loading or preloading may be to break up a very long range regular or periodic structure into short crystalline blocks or domains wherein certain crystalline segments of length, S, occur and define or determine the possible characteristic particle wave frequencies, $\nu_{pq}$, at which standing or running particle waves may occur in the sample. In accordance with the preceding development and Equations 13 and 15 therein these characteristic frequencies or modes are given by $$\nu_{pq} = \nu_1 \sin^2\left(\frac{q\pi}{2N}\right) \text{ (Standing waves)} \quad (28)$$

$$q = 1, 2, 3 \ldots (N-1)$$

$$\nu_{pq} = \nu_1 \sin^2\left(\frac{q\pi}{N}\right) \text{ (Running waves)} \quad (29)$$

$$q = 1, 2, 3, \ldots (N-1)/2$$

where $S = Nd$ is the segment length; $\nu_1 = h/2m\ \pi^2 d^2$ and all other symbols have their previous meanings. From these equations it must again be very clear, as stated at the beginning of this application, that the particle waves which are the subject of discussion and the source of the resonant vibrations utilized in the manner and devices described herein are not the usual elastic vibrations associated with material bodies. Neither are they the mathematical probability waves sometimes associated with particles in the contemporary, orthodox theory of wave mechanics. They are instead a new kind of real-property wave which occur in material bodies undergoing non-elastic deformation under load.

In order to make useful application of these particle waves, a method and means for producing them in a controlled manner and with sufficient amplitude or strength must be invented; such means evidently consist of three basic elements: (1) a crystalline material with lattice segment lengths such as to define certain characteristic frequencies or modes for particle wave propagation in the material (2) a load applied to the crystalline material to produce particle waves propagating at one or more of these characteristic frequencies (3) vibrations applied to the material at one or more of the particle wave frequencies being propagated under the load applied so that resonance or resonances occur and enhanced particle wave vibrations result.

Thus the crystalline material, load means, and frequency of vibration means needed to produce resonant particle waves must be properly interrelated to obtain the desired result.

Many other aspects of the mechanical behavior of solids can also be understood in terms of the particle wave picture of plastic deformation, and studied by means of the apparatus and method given in this invention. These include hypervelocity impact properties; static and dynamic load-deformation (stress-strain) results, fracture, fatigue failure, and others.

Because of the intimate connection between particle waves and mechanical properties, it is also evident that the properties of various solids can be altered in a desirable way by the application of mechanical vibrations of just the right frequency. Plastic deformation or flow needed during cold forming of parts, for example, can be enhanced by applying vibrations (of the correct frequency) along with the steady forces usually applied.

Since certain changes can be made in the apparatus and combinations described, and different embodiments of the invention can be made without departing from the spirit and scope thereof, it is intended that all matters shown in the accompanying drawings and described herein shall be interpreted as illustrative and not in a limiting sense.

What is claimed is:

1. In an apparatus for producing resonant particle waves internally generated from a crystalline material, the combination of a crystalline material, load means disposed to act on said crystalline material, and vibration producing means positioned to cause vibration of the crystalline material, and means for adjusting one of said crystalline material, load means and vibration producing means to cause particle waves to occur in the crystalline material at the applied frequency of said vibration producing means.

2. In an apparatus for producing and detecting particle waves internally generated from a crystalline material, the combination of a crystalline material, load means disposed to act on said crystalline material, vibration producing means positioned to cause vibration of the crystalline material, vibration detection means positioned with respect to the crystalline material so as to detect vibration thereof, and means for adjusting one of said crystalline material, load means, and vibration producing means to cause particle waves to occur in the crystalline material at the applied frequency of said vibration producing means.

3. In an apparatus for producing and detecting standing particle waves internally generated from a crystalline material, the combination of a solid base, means carried by said base for producing vibrations, a crystalline material being positioned on said vibration producing means, load means acting on said crystalline material, means mounted on said base positioned so as to detect vibrations of the crystalline material, and means for adjusting one of asid crystalline material, load means, and vibration producing means to cause particle waves to occur in the crystalline material at the applied frequency of said vibration producing means.

4. In an apparatus for producing and detecting particle waves internally generated from a crystalline material, the combination of a solid base, means carried by said base for producing vibrations, a crystalline material being positioned on said vibration producing means, load means acting on said crystalline material, and means mounted on said base positioned so as to detect vibrations of said crystalline material, means on said base for moving said crystalline material and said vibration detecting means with respect to each other, and means for adjusting one of said crystalline material, load means and vibration producing means to cause particle waves to occur in the crystalline material at the applied frequency of said vibration producing means.

5. In an apparatus for producing and detecting particle waves internally generated from a crystalline material, the combination of a solid base, a piezoelectric agitator carried by said base for producing vibrations with a crystalline material being mounted thereon, load means acting on the crystalline material, a support upstanding from said base and adjacent to said agitator, means responsive to vibrations mounted on said support in contact with said crystalline material for detecting vibrations thereof, and means for adjusting one of said crystalline material, load means and vibration producing means to cause particle waves to occur in the crystalline material at the applied frequency of said vibration producing means.

6. In an apparatus for producing and detecting particle waves internally generated in a crystalline material, the combination of a solid base with there being a circular track on the upper surface of said base, a piezoelectric agitator carried by said base for producing vibrations with a crystalline material being mounted thereon, load means acting on the crystalline material, a support upstanding from said track on said base and adjacent to said agitator so as to be positionable circumferentially of the crystalline material, means responsive to vibrations mounted on said support in contact with said crystalline solid for detecting vibrations thereof, and means for adjusting one of said crystalline material, load means, and vibration producing means to cause particle waves to occur in the crystalline material at the applied frequency of said vibration producing means.

7. In an apparatus for producing and detecting particle waves internally generated in a crystalline material, the combination of a solid base, a piezoelectric agitator carried by said base for producing vibrations with a crystalline material being mounted thereon, load means acting on the crystalline material, a support upstanding from said base and adjacent to said agitator, piezoelectric means mounted on said support for detecting vibrations of the material, means for positioning said vibration detection means relative to said crystalline solid, and means for adjusting one of said crystalline material, load means, and vibration producing means to cause particle waves to occur in the crystalline material at the applied frequency of said vibration producing means.

8. In an apparatus for determining the orientation of single crystal samples, the combination of a solid base, an agitator carried by said base for producing vibrations with a crystal being mounted thereon, load means acting on the crystal, a support upstanding from said base and adjacent said agitator, means mounted on said support for detecting vibrations at a point, means for positioning said vibration detecting means in relation to the crystal whereby the point vibration detecting means may be directed to different places on the crystal surface, and means for adjusting one of said crystalline material, load means, and vibration producing means to cause particle waves to occur in the crystalline material at the applied frequency of said vibration producing means.

9. In an apparatus for amplifying vibrations, the combination of a crystalline material, means for applying a load thereto, vibration producing means positioned to cause vibrations of the crystalline material with said vibrations to be amplified, and means for adjusting one of said crystalline material, load means, and vibration producing means to cause particle waves to occur in the crystalline material at the applied frequency of said vibration producing means.

10. In an apparatus for producing a source of amplified vibrations, the combination of a crystalline material, means for applying a load thereto, vibration producing means positioned to cause vibrations in one part of the crystalline material with said vibrations to be amplified, means for coupling to another part of the crystalline material to obtain the amplified vibrations when said material is vibrated at one of its internal particle wave resonances, and means for adjusting one of said crystalline material, load means, and vibration producing means to cause particle waves to occur in the crystalline material at the applied frequency of said vibration producing means.

11. In an apparatus for amplifying electrical oscillations, the combination of a crystalline material, means for applying a load to said crystalline material, electrical means for producing vibrations in the crystalline material, means for converting said vibrations amplified through the crystalline material back into electrical oscillations, and means for adjusting one of said crystalline material, load means, and vibration producing means to cause particle waves to occur in the crystalline material at the applied frequency of said vibration producing means.

12. In an apparatus for amplifying electrical oscillations, the combination of a crystalline material, means for applying a load thereto, vibration producing means comprising electrical coils mounted firmly at different parts of said crystalline material, said vibration means further comprising permanent magnets each having air gaps with magnetic flux therein with said coils being positioned in said gaps so that an electrical potential applied to send a current through one coil produces vibration of the crystalline material and the production of an amplified induced potential across the other coil, and means for adjusting one of said crystalline material, load means, and vibration producing means to cause particle waves to occur in the crystalline material at the applied frequency of said vibration producing means.

13. In an apparatus for generating vibrations, the combination of a crystalline material, means for applying a variable load thereto, means for producing vibrations at one part of said crystalline material, means for coupling to said crystalline material to detect amplified vibrations at another part, and means interconnecting the said two portions of the crystalline material for feeding back a part of the amplified vibrations for use in said vibration producing means whereby the loaded crystalline material is continuously maintained in vibration at particular frequencies and so that a portion of the amplified vibrations is available for use, and means for adjusting one of said crystalline material, load means, and vibration producing means to cause particle waves to occur in the crystalline material at the applied frequency of said vibration producing means.

14. In an apparatus for generating electrical oscillations, the combination of a crystalline material, means for variable loading thereof, means for producing vibrations at one part of said crystalline material, means for coupling to the said crystalline material at another place to obtain amplified vibrations thereof, means for converting such amplified vibrations to electrical oscillations, and feedback means to feed back a portion of said amplified vibrations to the vibration producing means to produce sustained vibration of the crystalline material while the remaining portion of the amplified vibrations is available as an oscillating electrical voltage, and means for adjusting one of said crystalline material, load means, and vibration producing means to cause particle waves to occur in the crystalline material at the applied frequency of said vibration producing means.

15. In an apparatus for generating electrical oscillations, the combination of a crystalline material, means for loading thereof, electrical means for producing vibration at some part of said crystalline material, means for detecting amplified vibrations at another part of said crystalline material and converting them to electrical oscillations, and means for electrically connecting the electrical vibration producing means and the electrical detection means to feed back a portion of the amplified electrical output to the vibration producing means to produce sustained vibration of the loaded crystalline material, the remainder of the amplified output being available as an alternating electrical voltage, and means for adjusting one of said crystalline material, load means, and vibration producing means to cause particle waves to occur in the crystalline material at the applied frequency of said vibration producing means.

16. In an apparatus for generating electrical oscillations, the combination of a crystalline material, means for loading thereof, vibration producing means comprising electrical coils mounted firmly at different parts of said crystalline material, and further, permanent magnets each having air gaps with magnetic flux therein with said coils being positioned in said gaps so that an alternating electrical potential applied to one coil produces vibration of the crystalline material and the production of an amplified potential across the other output coil, electrical means for feeding back a portion of said amplified potential to the vibration producing coil whereby sustained vibration of the crystalline material takes place and a portion of the amplified oscillating electrical signal is available for use at the output coil, and means for adjusting one of said crystalline material, load means, and vibration producing means to cause particle waves to occur in the crystalline material at the applied frequency of said vibration producing means.

17. In an apparatus for generating directional sound vibrations in air, water, or other fluids comprising in combination, at least one single crystal, means for applying a load thereto, and vibration producing means positioned to cause vibration of the single crystal, and means for adjusting one of said crystalline material, load means, and vibration producing means to cause particle waves to occur in the crystalline material at the applied frequency of said vibration producing means.

18. In an apparatus for generating mechanical vibrations, the combination of a crystalline material, means for applying a load to said crystalline material so that said material exhibits a negative differential mechanical resistance, and mechanical parallel resonance means coupled to said crystalline material to produce sustained oscillations in the parallel mechanical resonance means.

19. In an apparatus for generating electrical oscillations, the combination of a crystalline material, means for applying a load to said crystalline material so as to have it exhibit a negative differential mechanical resistance, mechanical parallel resonance means coupled to said crystalline material so that sustained mechanical oscillations will occur in the mechanical resonance means, and means for converting said mechanical oscillations into electrical oscillations.

20. In an apparatus for generating mechanical vibrations, the combination of a crystalline material, mechanical parallel resonance means mounted on said crystalline material to produce a load thereon as a result of gravity acting on said parallel resonance means, said load on said crystalline material being such as to make it exhibit a negative differential mechanical resistance, said mechanical parallel resonance means being coupled to said crystalline material to produce sustained oscillations in said mechanical parallel resonance means.

21. In an apparatus for generating electrical oscillations, the combination of a crystalline material susceptible of being loaded so as to exhibit a negative differential mechanical resistance, a bilaminated strip spring member of piezoelectric material mounted on said crystalline material, said spring member being constructed so that flexing thereof will produce an electrical voltage across said strip, a mass member mounted on said spring member, said mass member and spring member defining mechanical parallel resonance means, said mechanical parallel resonance means being acted upon by gravity so as to apply a load to said crystalline material, said spring member and mass member being coupled to said crystalline solid to produce sustained oscillations of said mass and spring members.

22. In an apparatus for producing resonant particle waves internally generated from a crystalline material, the combination of a crystalline material, load means disposed to act on said crystalline material, and vibration producing means positioned to cause vibration of the crystalline material, said crystalline material having a preselected mosaic structure to give a lattice segment length such that a known frequency spectrum for the crystalline material exists.

23. In an apparatus for amplifying vibrations, the combination of a crystalline material, means for applying a load thereto, means for applying the vibrations to be amplified to the crystalline material, said crystalline material having a preselected mosaic structure to give a lattice segment length such that a known frequency spectrum for the crystalline material exists.

No references cited.

ROY LAKE, *Primary Examiner.*

S. H. GRIMM, *Assistant Examiner.*